July 6, 1965

J. A. FERRO 3,193,035

AUTOMATIC TARE WEIGHT LOADING DEVICE

Filed Feb. 26, 1964

INVENTOR.
JOSEPH A. FERRO

July 6, 1965

J. A. FERRO 3,193,035

AUTOMATIC TARE WEIGHT LOADING DEVICE

Filed Feb. 26, 1964

INVENTOR.
JOSEPH A. FERRO
BY
ATTORNEY
AGENT

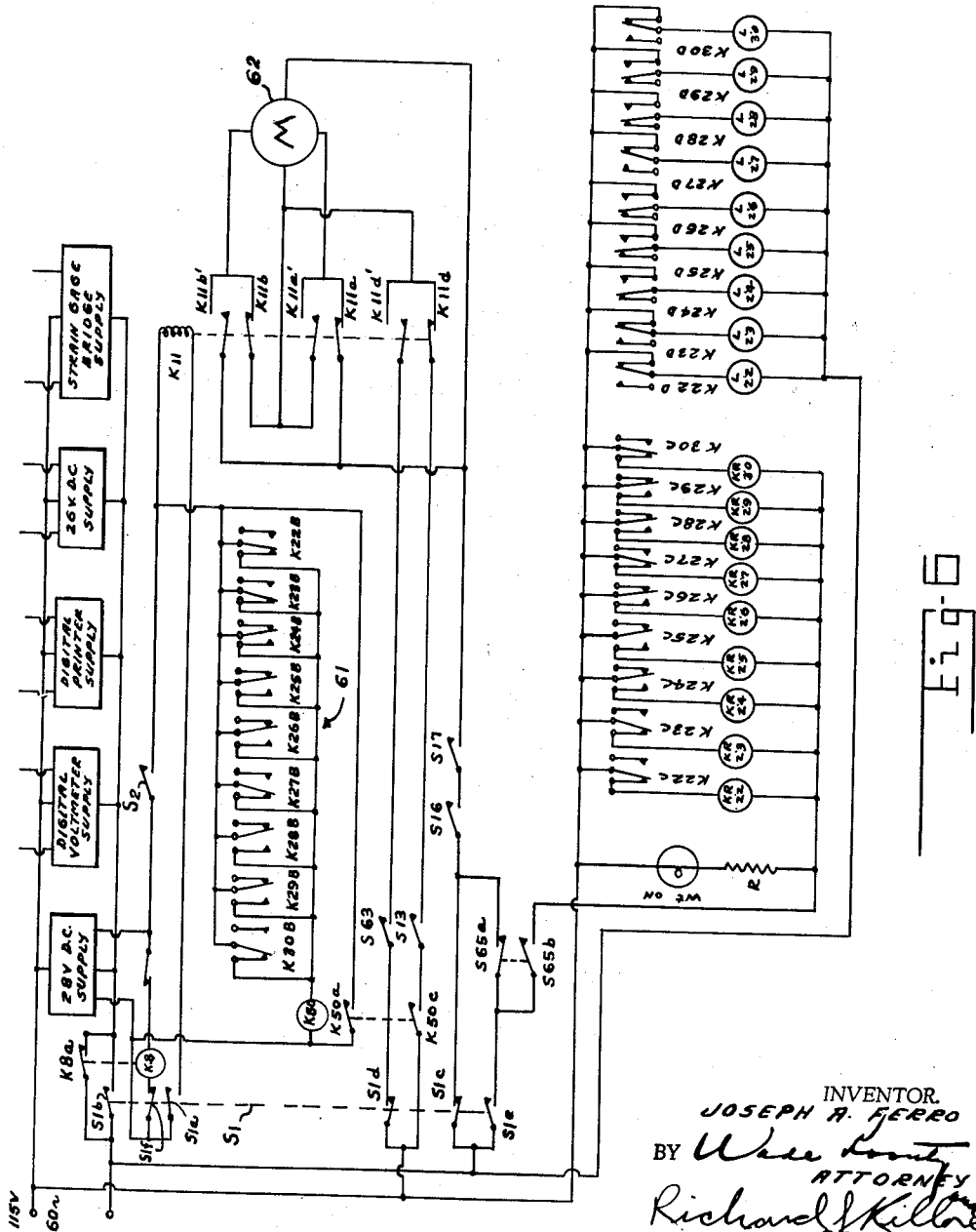

though the output of the digital voltmeter are connected to weight control relays 22 through 30 through a code converter 56.

United States Patent Office 3,193,035
Patented July 6, 1965

---

3,193,035
AUTOMATIC TARE WEIGHT LOADING DEVICE
Joseph A. Ferro, Park Ridge, Ill., assignor to the United States of America as represented by the Secretary of the Air Force
Filed Feb. 26, 1964, Ser. No. 347,633
5 Claims. (Cl. 177—248)

This invention relates to a system for automatically loading calibrated weights on the weight pan of an automatic precision weighing system.

One object of the invention is to provide a system for automatically loading calibrated weights on the weight pan of a scale to balance the scale to within ±1000 grams.

Another object of the invention is to provide a tare weight loading system which requires fewer weights than would normally be required.

These and other objects will be more fully understood from the following detailed description taken with the drawing, wherein:

FIG. 5 shows a portion of the mechanical arrangement for loading the weights on the loading pan in the device of FIG. 2.

FIG. 6 is a circuit schematic for the switching circuit for the device of FIG. 2.

One of the physical characteristics on which information is required on subjects undergoing tests in an environmental test chamber is their weight variations. The automatic precision system for accomplishing this comprises three separate functional units: the beam balance which is mounted on the top of the environmental test chamber, with the load platform inside the test chamber and the weight pan outside the test chamber; the tare weight system which automatically loads calibrated weights on the weight pan to balance the scale to within ±1000 grams out of a full range of 199 kilograms; and the fine balance unit which automatically controls a length of precision chain affixed to the weight pan end of the scale to complete the balance to within 5 grams accuracy. The sum of the tare weight and the differential chain weight is the subject's total weight.

The tare weight unit of this invention consists of a weight loading mechanism which automatically loads any combination of nine weights on the weight pan. The magnitude of weights that are placed on the weight pan is determined by a strain gauge type load cell mounted below the knife edge between the balance beam and the load platform. The load cell has an output voltage which is proportional to the applied load. The digital voltmeter converts this voltage to decimal digital form with a minimum increment of 1000 grams and supplies corresponding contact closures to operate a printer. According to this invention, use is made of the output normally applied to the printer to select the weights for loading on the weight pan. The use of decimal digital weight increments for a counterbalance of 199 kilograms in 1 kilogram increments however would require 21 weights. According to this invention binary digital weight increments are used which require only 9 weights. This invention provides a system for using binary digital weight loading to counterbalance 199 kilograms in 1 kilogram increments.

Figure 1:
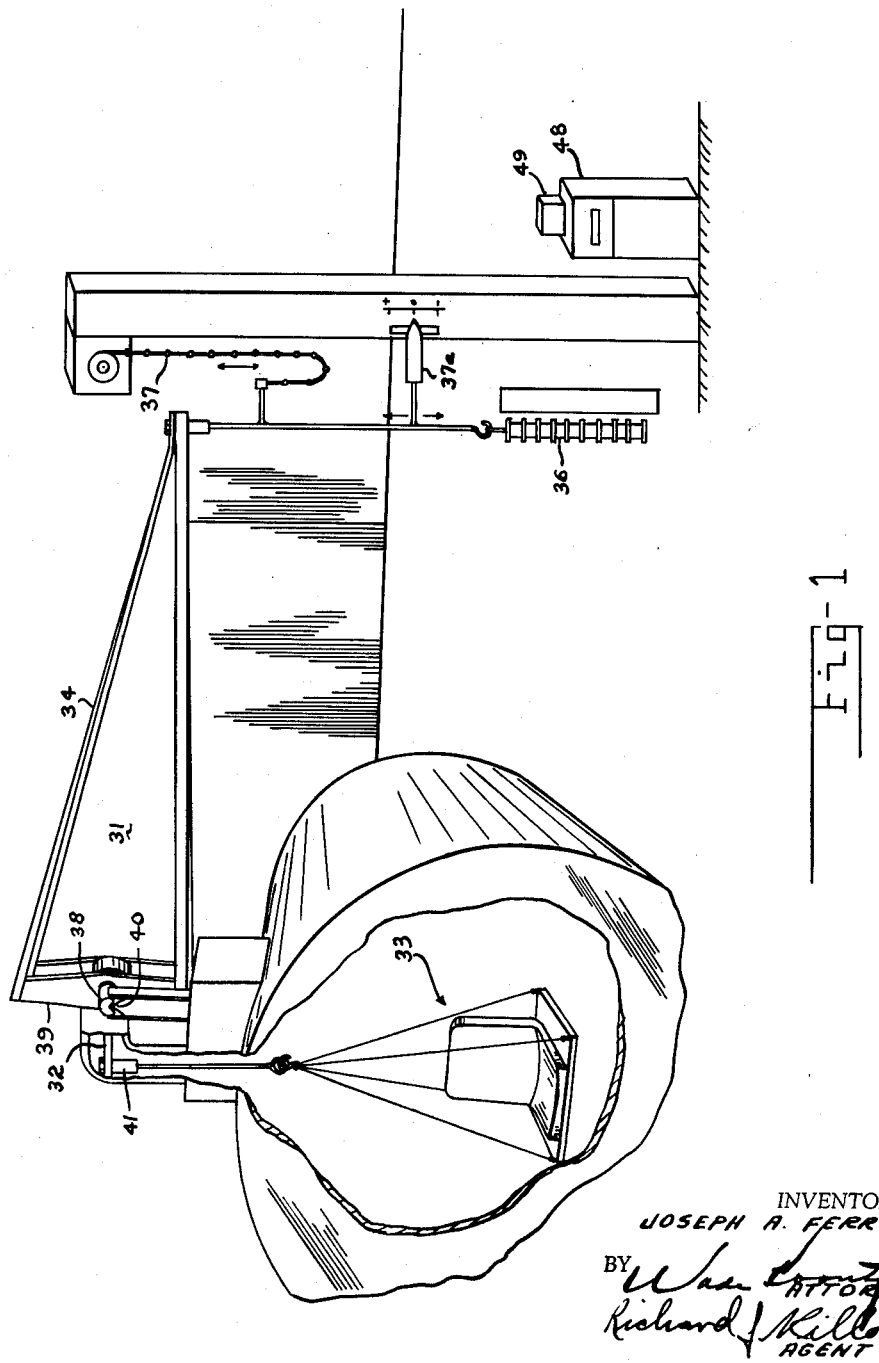
FIG. 1 shows the weighing system with which the automatic weight loading system of the invention is used.

Referring now to FIG. 1 of the drawing, reference numeral 31 refers to an automatic precision weighing system having a short beam arm 32 attached to the load member indicated generally at 33, and a long beam arm 34 supporting the tare weight pan 36 and the fine balance chain 37 at the end thereof. The arm 37a energizes two photocells to control the fine balance chain 37. The short arm 32 is joined to the midpoint of axle 38 and the long arm 34 is connected to the axle 38 by means of a yoke 39. The axle 38 is supported on two knife edges one of which is shown at 40. A strain gauge load cell 41, for use in the automatic tare weight loading system as will be described later, is connected between the short beam arm 32 and the load member 33. The ratio of lengths between the long beam and short beam is 10:1.

Figure 2:
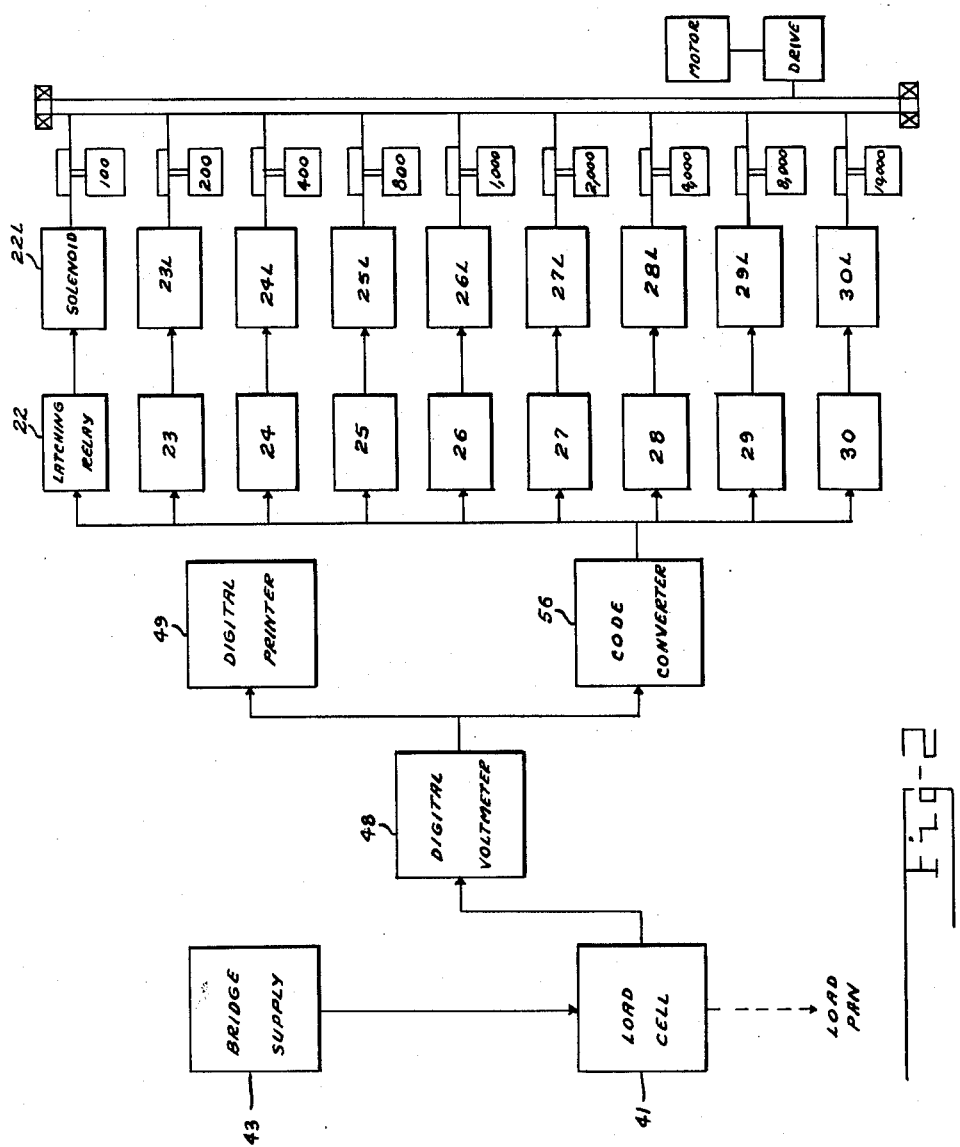
FIG. 2 is a block diagram of the automatic weight loading system used with the device of FIG. 1.
Figure 3:
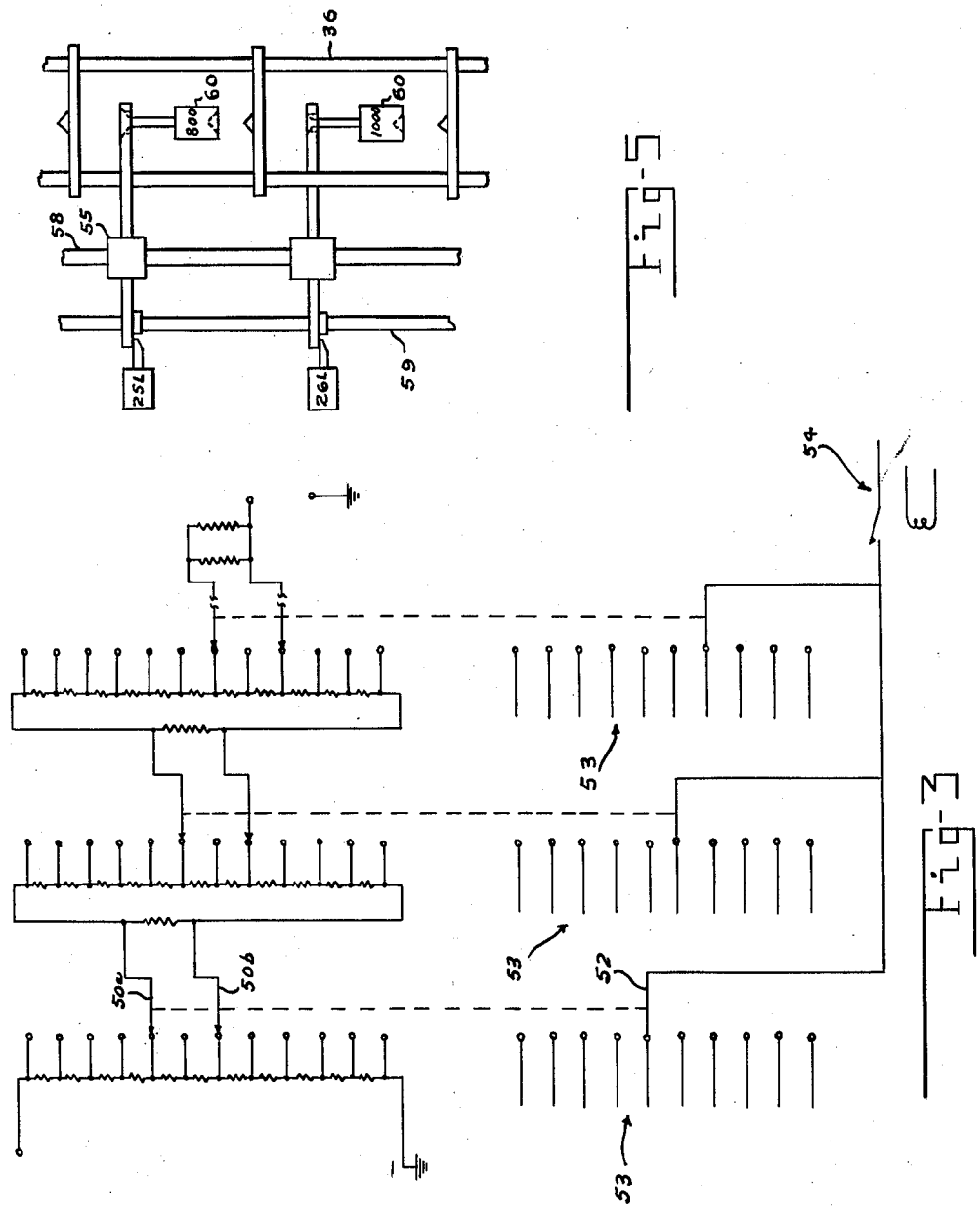
FIG. 3 shows a circuit schematic of a portion of the voltage divider and output of a standard digital voltmeter.
Figure 4:
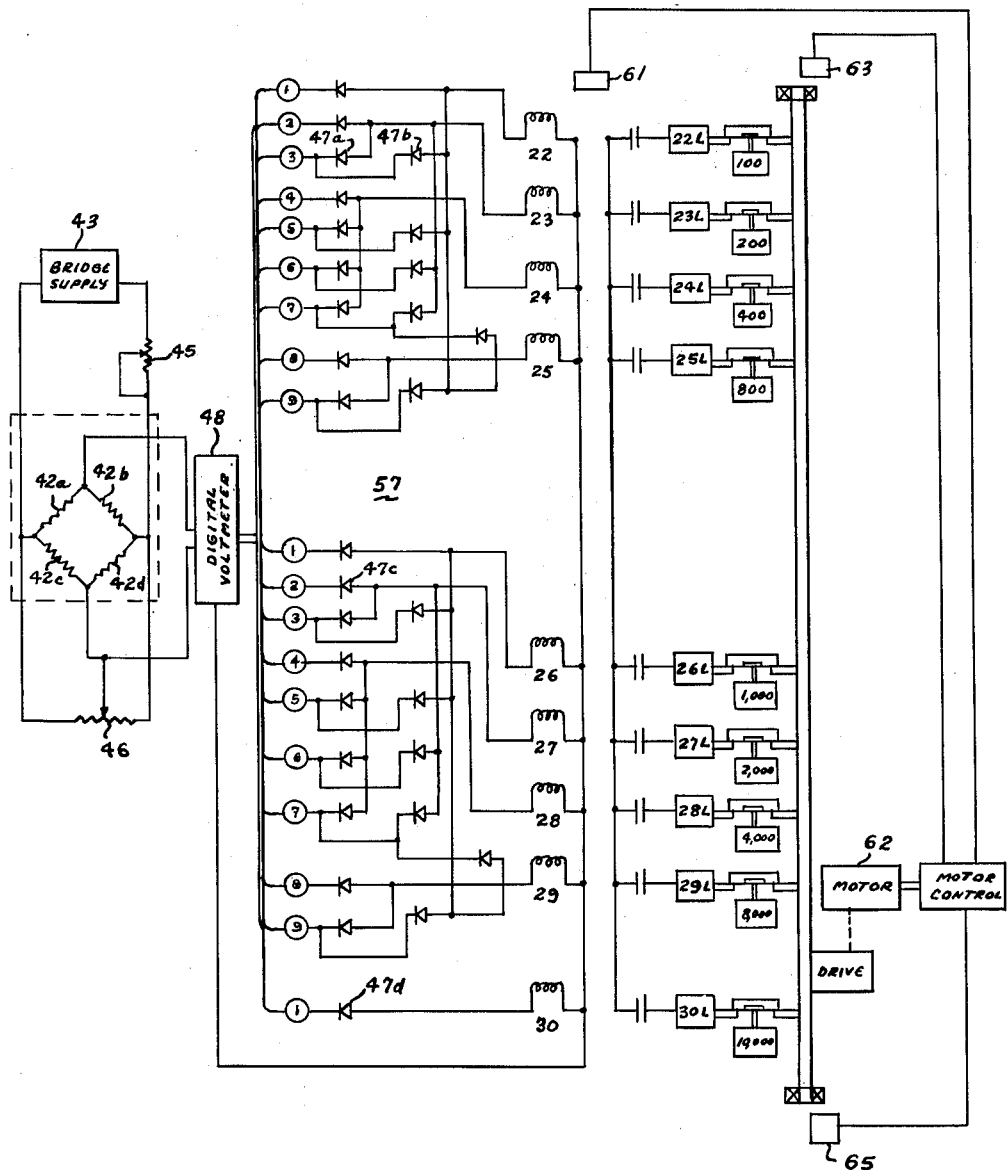
FIG. 4 is a circuit schematic partially in block form of the device of FIG. 2.

The automatic tare weight loading system of the invention shown in FIG. 2 has a load cell 41 which includes four strain gauges 42a, 42b, 42c and 42d connected in a bridge circuit as shown in FIG. 4. The bridge is fed by voltage supply 43. A range adjustment resistor 45 is connected between the power supply and the bridge. A potentiometer 46 is provided for balancing the bridge. The output of the strain gauge bridge is connected to a digital voltmeter 48 which samples the absolute D.C. voltage which is scaled to represent weight in kilograms. The digital voltmeter used is a standard Non-Linear Systems Model V34 voltmeter which operates a recorder or digital printer 49 to provide a visual presentation of the weight of the load. The output of the strain gauge bridge is compared with a standard internal voltage in the digital voltmeter. The comparison is made by dividing the standard voltage until it equals the input voltage. The contacts 50a and 50b are stepped until the input voltage is bracketed between contacts 50a and 50b. This voltage is then applied to the next decade voltage divider and the same process is repeated for each position. The wiper contact 52 follows contacts 50a and 50b to select an output line corresponding to the strain gauge voltage. The output lines 53 are normally connected to the digital printer. The print relay indicated schematically at 54 operates the printer when a match is made. Use is made of these printer outputs to automatically load the tare weight on the weight pan. The output of the digital voltmeter consists of three decimal digits each representing the numbers from zero through nine. Thus a weight of 123 kilograms is represented by the positioning of wipers 52 at 3 in the units digit, line 2 in the tens digit and line 1 in the hundreds digit.

The digital lines from the digital voltmeter are connected to weight control relays 22 through 30 through a code converter 56. The code converter consists of a diode matrix 57 shown in FIG. 4. The diode matrix 57 converts the decimal digital output of the digital voltmeter to binary coded decimal form. For the example given above, the output of units digit line 3 of the digital voltmeter 48, will be applied to relays 22 and 23 through the diodes indicated at 47a and 47b, the output of the tens digit 2 of voltmeter 48 will be applied to relay 27 through the diode indicated at 47c and the output of the hundreds digit 1 of voltmeter 48 will be applied to relay 30 through the diode indicated at 47d. The print signal from the voltmeter 48 operates the printer and also operates the relays 22–30 after a balance has been reached in the voltmeter. Since the print signal exists only until after the printer has operated, mechanical latching relays are used for relays 22–30. Each of the relays 22–30 controls corresponding weight solenoid 22L–30L, as will be explained later. The solenoids 22L–30L release corresponding weights which are then loaded on the weight loading pan 36 shown in FIG. 5. The weights 60 are held off of the weight loading pan by solenoids 22L–30L which when energized allow weight support blocks 55 to slide to a collar on weight loading rod 59. When the weight loading rod 59 lowers, the released weights are applied to the weight loading pan. Operation of any of the relays 22–30 closes a relay contact shown generally at 61 in FIG. 4 to start motor 62 to lower the weight loading rod 59 to allow loading of the released weights 60 onto the pan 36. When the rod 59 leaves the top position switch 63 is closed. When the rod reaches its lower position it operates switch 65 to stop the motor and release the latching relays 22–30 through release coils KR22–KR30. Upon release of the relays 22–30, the weight solenoids 22L–30L are deenergized. Support blocks 55 are free to slide on support rod 58 to aid in loading the weights on the pan 36. The various interlocks used in the operation of the tare weight loading device are shown in FIG. 6.

In the operation of the device with reference to FIG. 6, switch S1 is operated opening contacts S1c, S1d and S1f and closing contacts S1a, S1b and S1e. Closure of S1b supplies power to the entire system. When switch S2 is closed relay K11 is energized thus closing switches K11a', K11b' and K11d' and opening switches K11a, K11b and K11d. The motor 62 is then connected in its drive down condition. When the voltmeter selector, not shown, is set to the proper position switch S13 is closed. With the weight of 123 kilograms, described above, relays 22, 23, 27 and 30 will close the B contacts indicated generally at 61 in FIG. 4 and at K22b, K23b, K27b and K30b in FIG. 6 thus closing the circuit through relay K50 thus closing contacts 50a and 50c. When K50c closes the motor 62 is energized to drive down through switches K50c, S13, K11d', K11a', K11b', S16, S17, S65a, and S1e. At the same time the C contact banks arm the release coils and the D contact banks energize the weight solenoids. When the rod 59 leaves its upper position switch contacts S63 are closed. When the motor reaches its lower position switch S65 is operated opening contact S65a stopping the motor, and closing contacts S65b. S65b also energizes the weight "ON" indicator and the relay release coils KR22, KR23, KR27 and KR30 removing power for the weight solenoids by opening the D contact banks for the relays.

When the switch S1 is returned to the off position contacts S1a, S1b and S1e are opened and contacts S1c, S1d and S1f are closed. When S1a opens relays K11 closes the contacts K11a, K11b and K11d and opens the contacts K11a', K11b', and K11d' to change the motor to its drive up condition. Switch S1a' completes the circuit through relay K8 to close contact K8a to bypass switch S1b. Switch S1d completes the circuit through the motor to raise the weights from the weight pan 36. When the loading rod reaches the top position it operates switch S63 thus opening the circuit to the motor. Safety switches S16 and S17 may be provided adjacent switches 63 and 65 to remove power from the motor drives past the normal stop switches 63 and 65.

There is thus provided a system for automatically loading calibrated weights on the weight pan of an automatic weighing system.

While certain specific embodiments have been described in detail it is obvious that numerous changes may be without departing from the general principles and scope of the invention.

I claim:

1. An automatic counterbalance weight loading system comprising: a weighing system having a beam balance; a load pan and a weight pan; means for providing a first voltage proportional to the weight of a test load on said pan; means, responsive to said first voltage, for providing a decimal digital voltage proportional to the weight of said load; means for converting said decimal digital voltage to a binary coded decimal voltage; means, responsive to said binary coded decimal voltage, for loading weights, proportional to said binary coded decimal, on said weight pan.

2. An automatic counterbalance weight loading system comprising: a weighing system having a beam balance; a load pan and a weight pan; means for providing a first voltage, proportional to the weight of a test load, on said load pan; means, responsive to said first voltage, for providing a decimal digital voltage proportional to the weight of said load; means for converting said decimal digital voltage to a binary coded decimal voltage; a plurality of weights proportional to said binary coded decimal voltages; means for holding said weights off of said weight pan; means, responsive to said binary coded deicmal voltages for selectively loading said weights on said weight pan.

3. An automatic counterbalance weight loading system for a precision weighing system comprising: a weighing system having a beam balance; a load pan and a weight pan; means for providing a first voltage, proportional to the weight of a test load, on said load pan; means, responsive to said first voltage, for providing a decimal digital voltage, proportional to the weight of said load; means for converting said decimal digital voltage to binary coded decimal voltages; a plurality of weights selected according to a binary coded decimal relationship; solenoid means for holding said weights off of said weight pan; means for raising and lowering said weights; means, responsive to said binary coded decimal voltages for selectively operating said solenoid means to release certain of said weights proportional to said binary coded decimal voltages for loading on said weight pan; means, including said raising and lowering means, for removing said weights from said weight pan when said weighing system is de-energized.

4. An automatic counterbalance weight loading system for a precision weighing system comprising: a weighing system having a beam balance; a load pan and a weight pan; means for providing a first voltage, proportional to the weight of a test load, on said load pan; means, responsive to said first voltage, for providing a decimal digital voltage, proportional to the weight of said load; a plurality of latching relays, means for converting said decimal digital voltage to binary coded decimal voltages; means for applying said binary coded decimal voltages to said relays to actuate relays corresponding to said binary coded decimal voltages; a plurality of weights having a binary coded decimal relationship therebetween; a plurality of solenoid means for holding said weights off of said weight pan; a weight loading rod; means for supporting said weights on said weight holding rod; means for raising and lowering said weight loading rod; means responsive to said relays for lowering said weight raising and lowering means when one of said relays is energized; means, responsive to said relays and said weight loading rod for operating said solenoid means corresponding to said actuated relays to release corresponding weights for loading on said weight pan when said rod reaches its lower position; means, for releasing said latching relays after said weights are loaded on said weight loading pan; means, including said raising and lowering means, for removing said weights from said weight pan when said weighing system is de-energized.

5. All the improvements and advantages and features, singly and in combination, which are disclosed in either the specification or the claims.

References Cited by the Examiner

UNITED STATES PATENTS

| | | | |
|---|---|---|---|
| 3,047,083 | 7/62 | Chyo | 177—191 X |
| 3,055,444 | 9/62 | Chyo | 177—191 |
| 3,111,180 | 11/63 | Johnson | 177—248 |
| 3,134,448 | 5/64 | Chyo | 177—191 X |

FOREIGN PATENTS

| | | |
|---|---|---|
| 816,908 | 5/37 | France. |
| 1,010,283 | 6/57 | Germany. |
| 968,608 | 9/64 | Great Britain. |

LEO SMILOW, *Primary Examiner.*